(12) United States Patent
Pettus

(10) Patent No.: US 7,498,940 B2
(45) Date of Patent: Mar. 3, 2009

(54) RFID SYSTEM UTILIZING PARAMETRIC RERADIATED TECHNOLOGY

(75) Inventor: Michael Gregory Pettus, Aptos, CA (US)

(73) Assignee: Vubiq, Inc., Aliso Viejo, CA (US)

( * ) Notice: Subject to any disclaimer, the term of this patent is extended or adjusted under 35 U.S.C. 154(b) by 86 days.

(21) Appl. No.: 11/158,689

(22) Filed: Jun. 21, 2005

(65) Prior Publication Data
US 2005/0280539 A1 Dec. 22, 2005

Related U.S. Application Data

(60) Provisional application No. 60/581,384, filed on Jun. 22, 2004.

(51) Int. Cl.
*G08B 13/14* (2006.01)
(52) U.S. Cl. .............. 340/572.1; 340/572.4; 340/539.1; 340/10.1; 340/825.69; 340/825.72; 235/436; 235/462.13
(58) Field of Classification Search .............. 340/572.1, 340/572.4, 572.7, 539.1, 539.13, 825.49, 340/825.69, 10.1, 10.4, 825.52, 825.54, 825.72; 235/383, 385, 426.13, 487, 492, 380, 381, 235/436, 462.13, 489
See application file for complete search history.

(56) References Cited

U.S. PATENT DOCUMENTS

| | | | |
|---|---|---|---|
| 4,684,952 A | 8/1987 | Munson et al. | |
| 4,752,680 A | 6/1988 | Larsson | |
| 5,103,210 A | 4/1992 | Rode et al. | |
| 5,218,189 A | 6/1993 | Hutchison | |
| 5,381,137 A * | 1/1995 | Ghaem et al. ............ | 340/572.5 |
| 5,444,223 A | 8/1995 | Blama | |

(Continued)

FOREIGN PATENT DOCUMENTS

EP 1 065 623 A2 6/2000

(Continued)

OTHER PUBLICATIONS

Armin W. Doerry and Fred M. Dickey; *Synthetic Aperture Radar*; Optics & Photonic News, Nov. 2004; pp. 28-33.

(Continued)

*Primary Examiner*—Hung T. Nguyen
(74) *Attorney, Agent, or Firm*—Nixon Peabody LLP; David B. Ritchie

(57) ABSTRACT

A system and method for encoding and decoding information by use of radio frequency antennas. The system includes one or more interrogator devices and RFID data tags. The RFID data tags include a plurality of antenna elements which are formed on a substrate or directly on an object. The antenna elements are oriented and have dimensions to provide polarization and phase information, whereby this information represents the encoded information on the RFID tag. The interrogator device scans an area and uses radar imaging technology to create an image of a scanned area. The device receives re-radiated RF signals from the antenna elements on the data tags, whereby the data tags are preferably represented on the image. The re-radiated RF signals preferably include polarization and phase information of each antenna element, whereby the information is utilized using radar signal imaging algorithms to decode the information on the RF data tag.

12 Claims, 10 Drawing Sheets

U.S. PATENT DOCUMENTS

| | | | |
|---|---|---|---|
| 5,486,830 A | | 1/1996 | Axline, Jr. et al. |
| 5,726,630 A | * | 3/1998 | Marsh et al. ............... 340/10.2 |
| 5,767,802 A | | 6/1998 | Kosowsky et al. |
| 5,784,543 A | | 7/1998 | Marchand |
| 5,995,019 A | * | 11/1999 | Chieu et al. .............. 340/10.32 |
| 6,027,027 A | * | 2/2000 | Smithgall .................. 235/488 |
| 6,104,333 A | * | 8/2000 | Wood, Jr. .................... 341/173 |
| 6,236,761 B1 | | 5/2001 | Marchand |
| 6,405,132 B1 | | 6/2002 | Breed et al. |
| 6,424,315 B1 | | 7/2002 | Glen et al. |
| 6,427,922 B1 | | 8/2002 | Marchand |
| 6,476,756 B2 | * | 11/2002 | Landt ........................... 342/42 |
| 6,509,836 B1 | * | 1/2003 | Ingram .................... 340/572.4 |
| 6,526,352 B1 | | 2/2003 | Breed et al. |
| 6,542,083 B1 | * | 4/2003 | Richley et al. ......... 340/825.49 |
| 6,545,646 B2 | | 4/2003 | Marchand |
| 6,547,140 B2 | | 4/2003 | Marchand |
| 6,600,428 B1 | | 7/2003 | O'Toole et al. |
| 6,696,879 B1 | | 2/2004 | O'Toole et al. |
| 6,708,881 B2 | | 3/2004 | Hartmann |
| 6,720,920 B2 | | 4/2004 | Breed et al. |
| 6,721,289 B1 | | 4/2004 | O'Toole et al. |
| 6,735,183 B2 | | 5/2004 | O'Toole et al. |
| 6,748,797 B2 | | 6/2004 | Breed et al. |
| 6,768,944 B2 | | 7/2004 | Breed et al. |
| 6,771,981 B1 | | 8/2004 | Zalewski et al. |
| 6,820,897 B2 | | 11/2004 | Breed et al. |
| 6,836,472 B2 | | 12/2004 | O'Toole et al. |
| 6,842,106 B2 | * | 1/2005 | Hughes et al. ................ 340/5.8 |
| 6,867,983 B2 | | 3/2005 | Liu et al. |
| 6,874,639 B2 | | 4/2005 | Lawandy |
| 6,891,391 B2 | | 5/2005 | Hiroki |
| 6,897,284 B2 | | 5/2005 | Liu et al. |
| 6,970,089 B2 | * | 11/2005 | Carrender ................ 340/572.4 |
| 6,972,714 B1 | | 12/2005 | Baharav et al. |
| 2002/0140557 A1 | | 10/2002 | Dukler et al. |
| 2003/0002029 A1 | | 1/2003 | Dukler et al. |
| 2003/0006901 A1 | * | 1/2003 | Kim et al. |
| 2003/0035131 A1 | | 2/2003 | Dukler et al. |
| 2003/0137446 A1 | | 7/2003 | Vavik |
| 2003/0227382 A1 | * | 12/2003 | Breed |
| 2004/0159708 A1 | | 8/2004 | Yogev et al. |
| 2004/0169847 A1 | | 9/2004 | Dukler et al. |
| 2004/0211840 A1 | | 10/2004 | Yogev et al. |
| 2004/0217171 A1 | | 11/2004 | deVos et al. |
| 2006/0109176 A1 | | 5/2006 | Lee et al. |

FOREIGN PATENT DOCUMENTS

| | | | | |
|---|---|---|---|---|
| EP | | 1065623 | * | 6/2000 |
| WO | | WO 2004/081545 A1 | | 9/2004 |

OTHER PUBLICATIONS

A. Meta and P. Hoogeboom, International Research Centre for Telecommunications-transmission and Radar, Delft University of Technology; *Time analysis and processing of FM-CW SAR signals*; pp. 1-6.

Envisat's Mission and System Instruments Product Handbook, Section 5.2 RADAR and SAR Glossary; as of Jun. 15, 2005; pp. 1-21.

J. Huang, Spacecraft Telecommunications Equipment Section; *Analysis of a Microstrip Reflectarray Antenna for Microspacecraft Applications*, TDA Progress Report 42-120; Feb. 15, 1995; pp. 153-173.

Malibu Research, Calabasas, CA; *FLAPS™ Reflector Antennas*, pp. 1-6.

Dr. Victor C. Chen, Mark E. Dunham, Ping Chen, Ph.D. and Prof. C.H. Chen; *Four Practical Application of Joint Time-Frequency Analysis, Applying the Joint Time-Frequency Transform to Inverse Synthetic Aperture Radar; Joint Time-Frequency Representations for Real-Time Detection of Time-Varying Signals; Economic Data Analysis with the Gabor Spectrogram, The Gabor Spectrogram in Ultrasonic Nondestructive Materials Evaluation*, National Instruments Corporation, Application Note 067; May 1995; pp. 2-15.

Dale Dubbert, George Sloan and Armin Doerry; *FPGA's Role in the Development of Synthetic SARs*, www.wirelessdesignmag.com; pp. 1-4.

Gildas P. Gauthier, Jean-Pierre Raskin, Linda P.B. Katehi and Gabriel M. Rebeiz; *A 94-GHz Aperture-Coupled Micromachined Microstrip Antenna*, IEEE Transactions on Antennas and Propagation, vol. 47, No. 12; Dec. 1999; pp. 1761-1766.

A. Meta and P. Hoogeboom, International Research Centre for Telecommunications-transmission Radar, Delft University of Technology; *High Resolution Airborne FM-CW SAR: Digital Signal Processing Aspects*; pp. 1-3.

Dr. Allen E. Fuhs, Ph.D.; *Radar Cross Section (RCS)*; pp. 4-11.1-4-11.5

Chris Burroughs; *Sandia's miniSAR offers great promise for reconnaissance and precision-guided weapons*; Sandia LabNews, vol. 56, No. 3; Feb. 6, 2004; pp. 1 and 4.

Dr. D. Gabor, *A New Microscopic Principle*; Nature, vol. 161; May 15, 1948; pp. 777-778.

J.S. Dunn et al.; *Foundation of rf CMOS and SiGe BiCMOS technologies*; IBM J. Res. & Dev.; vol. 47, No. 2/3; Mar./May 2003; pp. 101-138.

Notification of Transmittal, International Search Report, Written Opinion of International Searching Authority; PCT/US2005/022146; Int'l Filing Date Jun. 22, 2005; 10 pages.

Zhou, Lei et al., "Reflectivity of Planar Metallic Fractal Patterns," Applied Physics Letter, vol. 82, No. 7, Feb. 17, 2003, pp. 1012-1014.

* cited by examiner

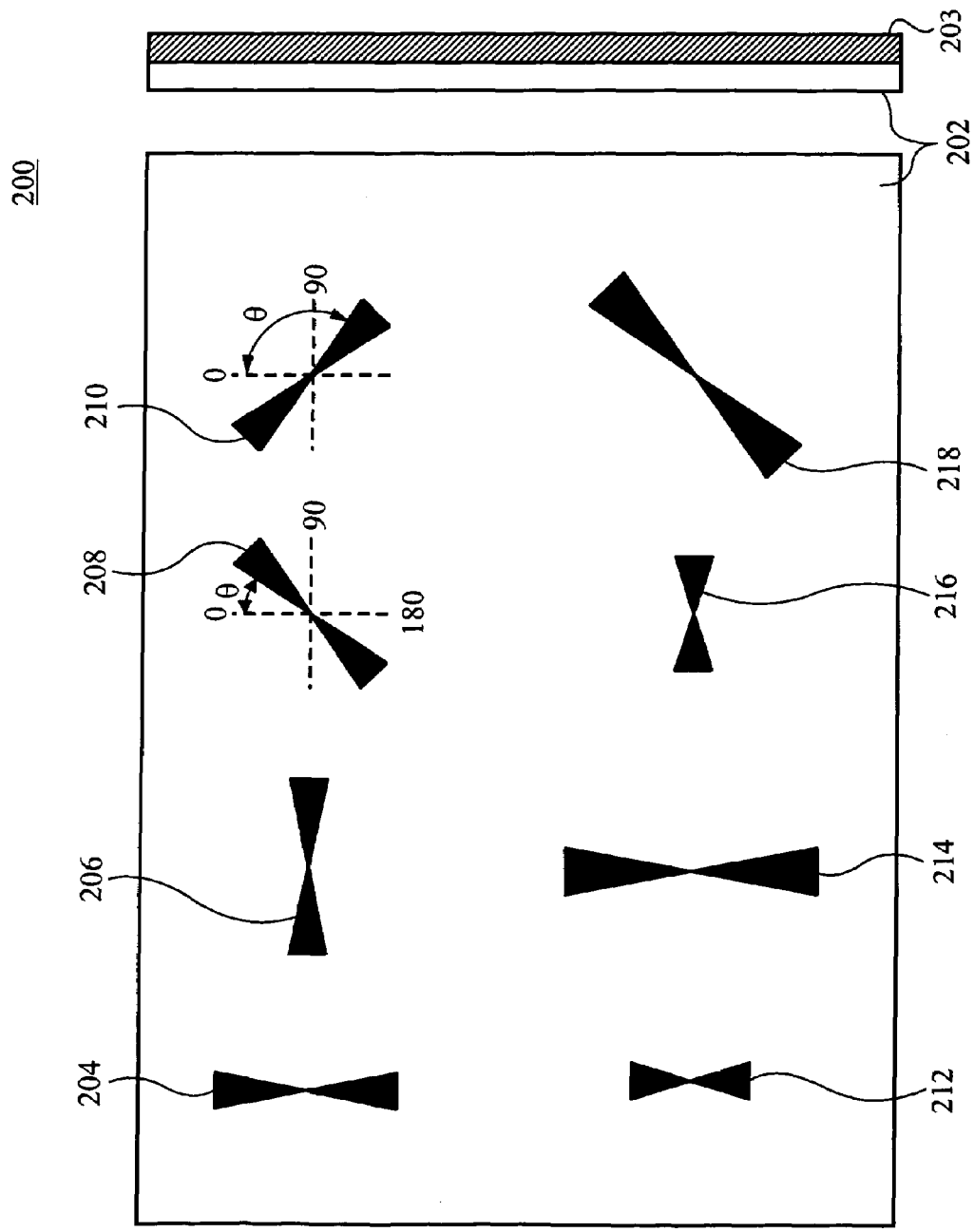

| Polarization (degrees) | Phase (degrees) | Binary Code (bits) |
|---|---|---|
| 0 | 0 | 0000 |
| 0 | +90 | 0001 |
| 0 | -90 | 0010 |
| 0 | 180 | 0011 |
| 45 | 0 | 0100 |
| 45 | +90 | 0101 |
| 45 | -90 | 0110 |
| 45 | 180 | 0111 |
| 90 | 0 | 1000 |
| 90 | +90 | 1001 |
| 90 | -90 | 1010 |
| 90 | 180 | 1011 |
| 135 | 0 | 1100 |
| 135 | +90 | 1101 |
| 135 | -90 | 1110 |
| 135 | 180 | 1111 |

*Fig. 6*

RFID SYSTEM UTILIZING PARAMETRIC RERADIATED TECHNOLOGY

STATEMENT OF RELATED APPLICATION(S)

The present application claims priority based on U.S. Provisional Patent Application Ser. No. 60/581,384, filed on Jun. 22, 2004, in the name of inventor Michael Gregory Pettus, entitled "Millimeter Wave RFID System Using Parametric Reflective Encoding," commonly owned herewith, which is hereby incorporated herein by reference.

FIELD OF THE INVENTION

The present invention is directly generally to the field of radio frequency identification (RFID) interrogators and data tags as well as encoding and decoding methods.

BACKGROUND OF THE INVENTION

There are many existing technologies in current development and deployment that implement the desired function of identifying articles, objects, vehicles and personnel. Bar codes and magnetic strips are traditionally familiar as short range devices. More recently, techniques for increasing the read reliability are being used in the general area of radio frequency identification or RFID.

RFID technology utilizes a tag transponder, which is placed on an object, and a reader, also referred to herein as an interrogator, to read and identify the tag. RFID technologies are broadly categorized using "active" tags with the longest range, and "passive tags" with a much shorter range (typically less than 20 feet). The industry categorizes active tags as having a local power source (such as a battery) so that the active tag sends a signal to be read by the interrogator. The industry categorizes passive tags as those whose power is derived from the reader, whereby the passive tag re-transmits or transponds information upon receiving the signal from the reader.

In both of these categories of tags, there is an electronic circuit that is typically in the form of an integrated circuit or silicon chip, whereby the circuit stores and communicates identification data to the reader. In addition to the chip, the tag includes some form of antenna that is electrically connected to the chip. Active tags incorporate an antenna which communicates with the reader from the tag's own power source. For passive tags, the antenna acts as a transducer to convert radio frequency (RF) energy originating from the reader to electrical power, whereby the chip becomes energized and performs the communication function with the reader.

Considering that active and passive tags have electronic circuitry in the form of a chip, the manufacturing costs for each tag is significant. Not only is there a cost associated with the chip itself, but there are also numerous processing steps required in order to place the chip onto the tag. In addition, existing tags require a method of mechanically and electrically connecting the antenna to the chip, which adds to manufacturing costs.

It should also be noted that active and passive RFID tag technologies are fundamentally based on an interrogate-and-then-communicate sequence of operations. Therefore there is an amount of time for the interrogator to read the tag which is dependent on the RF bandwidth and the data rate of the communications channel between the interrogator and the tag. If more than one tag is within range of the interrogator, multiple interfering transmissions can result from the interrogator attempting to read a single tag. Also of note, in the types of RFID systems thus described, there are no straightforward methods to accurately locate and track a tag. The technologies described above provide only a method of identification.

What is needed is a chipless RFID system and method that would provide greater range between the interrogator and the tags, lower manufacturing costs of the tags, and less aggregate read time for multiple tags in proximity to each other. What is also needed is a system which accurately locates and tracks a tag.

BRIEF DESCRIPTION OF THE INVENTION

A system and method for encoding and decoding information by use of radio frequency antennas includes one or more interrogator devices and RFID data tags. The RFID data tags include a plurality of antenna elements which are formed on a substrate or directly on an object. The antenna elements are oriented and have dimensions to provide polarization and phase information representing the encoded information on the RFID tag. The interrogator device scans an area and uses radar imaging technology to create an image of a scanned area. The device receives re-radiated RF signals from the antenna elements on the data tags, with the data tags represented on the image. The re-radiated RF signals preferably include polarization and phase information of each antenna element, whereby the information is utilized using radar signal imaging algorithms to decode the information on the RF data tag.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

FIG. 3A illustrates a schematic of an antenna configuration on a substrate of an RFID tag in accordance with one embodiment of the present invention.

FIG. 3B illustrates a side view of the RFID tag in accordance with one embodiment of the present invention.

FIG. 6 illustrates an example table of a data coding scheme for the RFID tag in accordance with one embodiment.

DETAILED DESCRIPTION

Embodiments of the present invention are described herein in the context of an RFID system utilizing parametric reflective technology. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

The present invention described herein preferably utilizes a very low cost RFID tag construction that does not require semiconductor or chip technologies. The present invention preferably can read the RFID tags at distances up to 100 meters as well as read and identify thousands of RFID tags per second. In addition, the present invention can preferably provide an accurate two and/or three dimensional location bearing of an RFID tag. If the RFID tag is located on a moving object, velocity and trajectory information can be computed by the interrogator of the present invention. The present invention preferably utilizes frequencies in the millimeter wave region, which allows detection of RFID tags behind foliage and non-metallic building materials. However, it is contemplated that the present invention utilizes frequencies in other ranges, and is not limited to the millimeter wave region.

The present invention can reduce operational expense, improve efficiencies and provide features to industry, government, homeland security, military, healthcare, education, transportation and consumers. The present invention can be used in a wide range of applications including, but not limited to: inventory identification; asset management tracking and shipping container location; vehicular access control (e.g. toll ways); moving vehicle identification; healthcare identification and tracking of patients, drugs, equipment and personnel identification, tracking and monitoring of personnel and equipment for security purposes; identification of luggage and packages at airports; systems for locating lost objects (e.g. keys, files, golf balls, clothing articles).

Figure 1A:
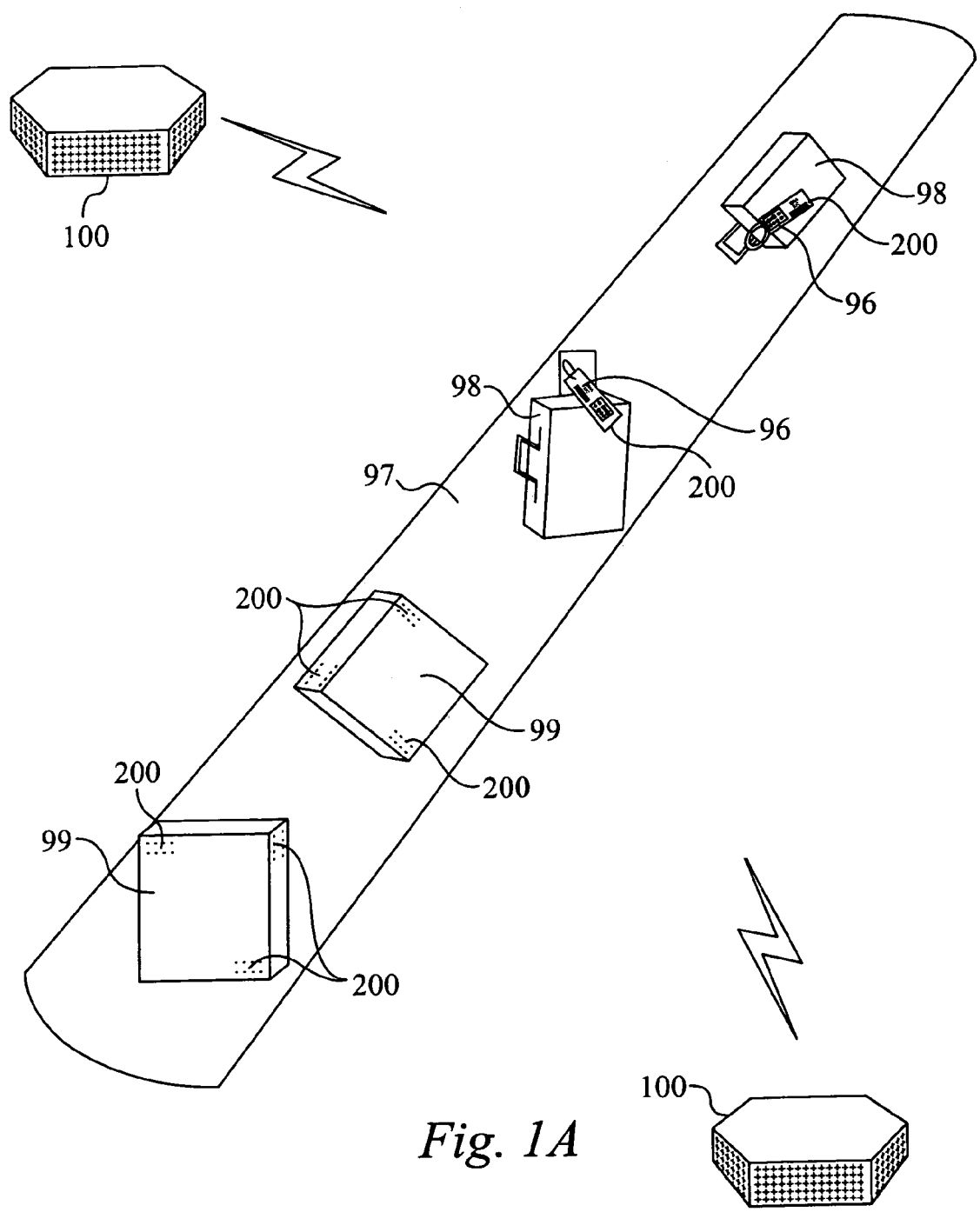
FIG. 1A illustrates a radio frequency identification (RFID) system for use in a baggage identification setting in accordance with one example embodiment of the invention.
Figure 1B:
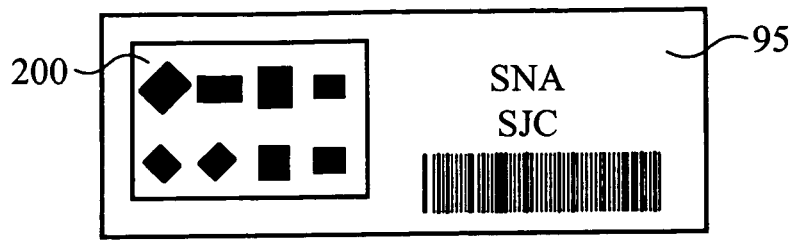
FIG. 1B illustrates a luggage label having the RFID tag of one embodiment of the present invention.
Figure 1C:
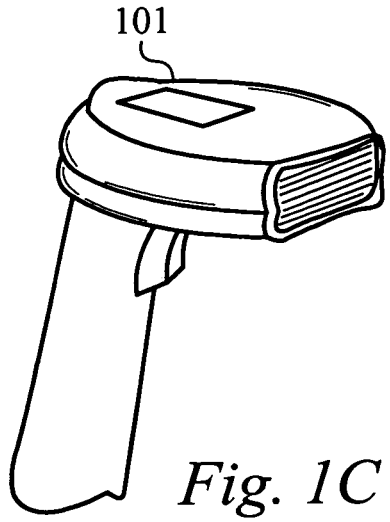
FIG. 1C illustrates a handheld RFID interrogator in accordance with one embodiment of the present invention.
Figure 1D:
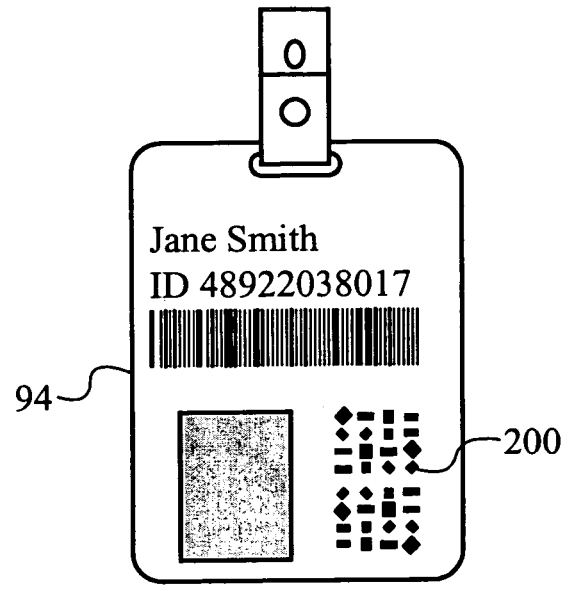
FIG. 1D illustrates a personal identification card having the RFID tag thereon in accordance with one embodiment of the present invention.
Figure 1E:
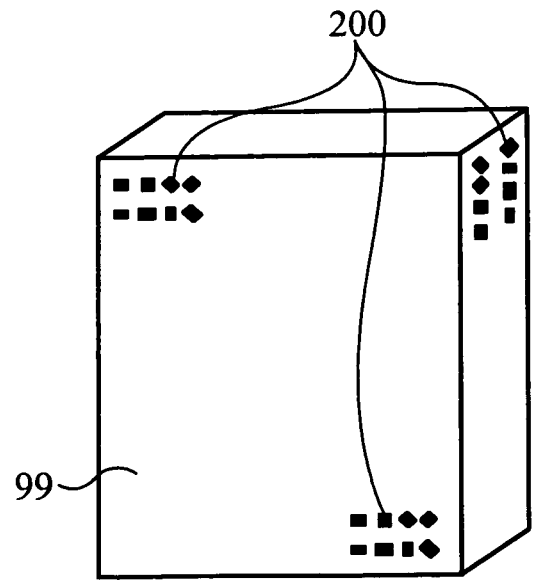
FIG. 1E illustrates a container having multiple RFID tags thereon in accordance with one embodiment of the present invention.

FIG. 1A illustrates an RFID system in accordance with one example embodiment of the present invention. As shown in FIG. 1A, the RFID system 10 includes one or more interrogators 100, also referred to as readers, as well as one or more RFID tags 200. The system shown in FIG. 1A depicts a conveyer belt 97 normally found in a baggage claim area in an airport, whereby various suitcases 98 and packages 99 are delivered on the conveyer belt 97. As shown in FIG. 1A, the packages 99 include one or more RFID tags 200 printed or affixed thereon, whereas the suitcases 98 each include an attachment 96 which includes the RFID tag 200 thereon. FIGS. 1B, 1D and 1E illustrate examples of the RFID tags 200 on the suitcases and packages.

The interrogators 100 are shown in FIG. 1A as stand alone units, whereby the interrogators locate, identify and optionally track each tag 200 as the items 98, 99 move on the conveyer belt 97. In another embodiment, the interrogator is in the form of a handheld unit 101, as shown in FIG. 1C. It should be noted that the RFID system of the present invention is operable in a multitude of applications and settings, some of which are discussed below, and is in no way limiting to the examples shown and described herein.

The present system 10 preferably utilizes mathematical focus algorithms in the area of radar imaging to decode and identify the RFID tags. The type of mathematical focus algorithms that are used by the system 10 depends on the application. For example, as shown in FIG. 1, the present system 10 can use inverse synthetic aperture radar (ISAR) algorithms to identify a moving tag 200 (in synthetic aperture radar terminology (SAR), "moving target") on a conveyor 97 which has a plurality of luggage articles 98, 99, whereby the luggage articles are physically moving in a translational direction relative to one or more interrogators 100. It should be noted that other mathematical focus algorithms can be used in the application shown in FIG. 1A and is not limited to SAR. In one embodiment, the interrogators 100 are fixed and disposed at various locations along the conveyor 97. The interrogators 100 are preferably positioned to be orthogonal and parallel relative to the direction of motion of conveyor 97.

Figure 2:
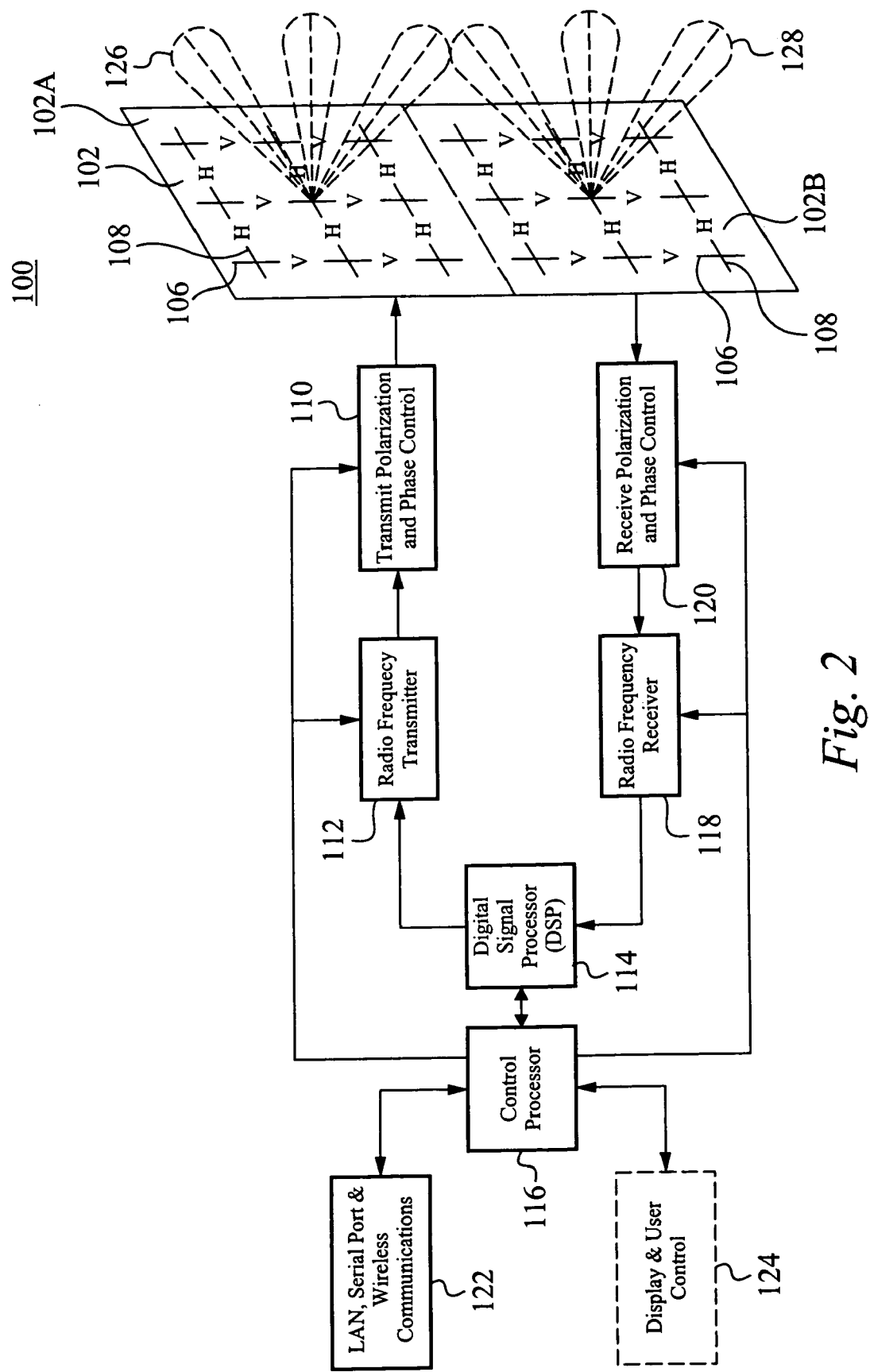
FIG. 2 illustrates a schematic of the RFID interrogator in accordance with one embodiment of the present invention.

FIG. 2 illustrates a schematic of the RFID interrogator in accordance with one embodiment of the present invention. It should be noted that the components in the interrogator 100 shown in FIG. 2 are preferred, and the interrogator 100 can include other components not shown. As shown in FIG. 2, the interrogator 100 preferably includes an antenna structure 102, a polarization and phase transmitting control block 110, a radio frequency transmitter 112, a digital signal processor (DSP) 114, a control processor 116, a radio frequency receiver 118 and a polarization and phase receiving control block 120. Although not shown, the interrogator includes an internal and/or external power source which supplies the necessary power to the locate and identify the RFID tags 200 within a specified distance. Preferably, the antenna structure 102 of the interrogator 100 is coupled to the transmitting and receiving control blocks 110 and 120. The transmitting control block 110 is preferably coupled to the radio frequency transmitter 112, both of which are preferably coupled to the control processor 116. The receiving control block 120 is preferably coupled to the radio frequency receiver 118, both of which are coupled to the control processor 116, as well. The radio frequency transmitter 112 and receiver 118 are preferably coupled to the DSP 114, whereby the DSP 114 is coupled to the control processor 116.

The control processor 116 preferably synchronizes the components of the interrogator 100 to ensure effective operation of the interrogator 100. In one embodiment, the control processor 116 is coupled to a wired or wireless network via hard-wire or wireless communication techniques (e.g. Ethernet [such as Power Over Ethernet, POE], Bluetooth, infra-red, RF wireless LAN). In one embodiment, the interrogator 100 includes an integrated display or user control 124, such as in a handheld unit (FIG. 1C), whereby the display 124 is coupled to the control processor 116. In one embodiment, the interrogator 100 is coupled to an external display or user control 124, such as on a network computer.

In one embodiment, a plurality of interrogators 100 are networked to communicate and be RF phase synchronous with one another such that information on separate perspectives of a common scanned area can be analyzed as an aggregate image. It is contemplated that one or more interrogators 100 in the plurality can transmit the RF signals simultaneously or non-simultaneously. It is also contemplated, as well, that one or more interrogators 100 can receive the reflected signals from the RFID tags 200 simultaneously or non-simultaneously. These methods of cooperative signal processing provide the basis for a plurality of image perspectives and thereby can create an image of the scanned area showing the locations of the tags 200 from different perspectives.

In the preferred embodiment, the interrogation device 100 transmits and receives RF electromagnetic radiation signals utilizing the antenna structure 102, as shown in FIG. 2. In particular, the antenna structure preferably includes a transmitting antenna array 102A and a receiving antenna array 102B which are shown in separate portions of the antenna structure 102. In the embodiment shown in FIG. 2, the transmitting antenna array 102A is located in the top section of the structure 102 whereas the receiving antenna array 102B is located in the bottom section. It is contemplated that the individual transmitting and receiving antennas 102A, 102B can be alternately arranged from top to bottom of the antenna structure 102 face. In another embodiment, one set of antennas serves the transmitting and receiving functions. In the embodiment shown in FIG. 2, the antenna structure 102 is shown as having a substantially flat, planar surface (two dimensional). In another embodiment, the antenna structure 102 has a non-planar configuration (e.g. conical, bulbed, angled) whereby the individual antennas in the array are positioned in three dimensions.

In general, the interrogator 100 utilizes one or more radio detection and ranging (RADAR) technologies to identify tags over a scanned area. The transmitting array 102A of the interrogator 100 transmits electromagnetic radiation to a large area at a desired frequency. Preferably, the frequency ranges between 30 GHz and 300 GHz, depending on the application in which the system 10 is used. However, other frequencies outside this range are contemplated. The electromagnetic radiation is received at the RFID tags 200 in the scanned area, whereby the antenna structures of the RFID tags 200 resonate at the desired frequency and re-radiate the electromagnetic signals back toward the interrogator 100. The interrogator 100 samples and stores the received signals from the RFID tag(s), as well as reflected electromagnetic radiation from all objects in the scanned area, and builds a signal phase history in a memory system. Through mathematical coherent phase analysis, the interrogator 100 preferably processes the phase history and polarization samples using general Synthetic Aperture Radar (SAR) signal processing algorithms, although other processing algorithms are contemplated. The interrogator 100 is then able to generate images of the scanned area from the phase history samples and associated polarization data to identify the RFID tags 200 in the area. In other words, the interrogator 100 is able to "view" the scanned area using RADAR technology and "see" the RFID tags and distinguish the tags 200 from other objects and RFID tags 200 by the orientations and dimensions of the antenna structures thereon.

The RFID system 10 of the present invention utilizes polarization and phase information, preferably in the millimeter wave range, to detect and identify the tags 200. As shown in FIG. 2, the antenna structure 102 of the interrogator 100 includes several vertically positioned antennas 106 as well several horizontally positioned antennas 108 in the transmitting and receiving sections 102A, 102B. The individual antennas 106, 108 independently transmit and receive signals utilizing different RF polarization schemes. For example, the antenna structure 102 can transmit RF signals with vertical polarization (V) as well as horizontal polarization (H). This is preferably performed by energizing the vertically oriented antennas 106 for vertically polarized signals, V and energizing the horizontally oriented antennas 108 for horizontally polarized signals, H.

In regards to the antenna structure 102 in FIG. 2, the interrogator 100 can transmit signals utilizing one polarization scheme while the antennas in the receiving section 102B can be controlled to receive signals of another polarization scheme. For example only, the interrogator 100 can transmit vertically polarized signals V and simultaneously receive signals which are horizontally polarized, H.

In addition, the interrogator 100 can control both the vertical and horizontal antennas to transmit and receive additional polarization parameters. The interrogator 100 can energize the vertically oriented antennas 106 and simultaneously energize the horizontally oriented antennas 108 with an appropriate phase difference to generate left-hand circular (LC) or right-hand circular (RC) polarized signals. Any combination of separate transmit and receive polarizations of vertical, horizontal, left-hand circular and right-hand circular (V, H, LC, RC) are preferably implemented in the present system 10. This allows the present system 10 to make use of polarization differences as well as diversity so that the interrogator 100 can store received signals which are created with different transmit and receive polarization parameters, as will be discussed in more detail below.

The interrogator 100 generates and receives radio frequency signals in a range of frequencies that are compatible with the frequency range of the resonant antenna elements on the RFID tags. The frequency of the transmitting signal is modulated in time by a modulation signal generated by the DSP processor 114. The DSP processor provides the modulation signal to the radio frequency transmitter 112, whereby the radio frequency transmitter 112 preferably creates a frequency modulated continuous wave (FMCW) signal. As known in the art, the distance (z axis) between the interrogator 100 and the RFID tags 200 can be determined using the FMCW signal. In particular, the sweep rate and sweep bandwidth of the transmitter array antenna 102A is measured and a beat frequency is created in the baseband by converting the signals received at the receiver array antenna 102B and measuring the content of the beat frequency.

As shown in FIG. 2, the radio frequency transmitter 112 sends the FMCW signal to the transmit polarization and phase control block 110, whereby the block 110 conditions the FMCW signal to a desired polarization and/or phase. The polarization and phase block 110 outputs the conditioned polarized and phased signal to the transmitting array antennas 102A. The signal is then converted into electromagnetic radiation by the transmitting array antennas 102A. Based on the conditioned signal, the transmitting array antenna 102A can transmit vertical (V), horizontal (H), right-hand circular (RC) or left-hand circular (LC) polarized electromagnetic radiation along a beam scanning pattern.

The transmitting array antennas 102A have the ability to directionally radiate electromagnetic radiation indicated by one or more patterns 126 in both the radial, translational, horizontal (x) and/or vertical (y) directions. The interrogator 100 preferably utilizes a mathematical focus method used in radar imagery to form a synthetic aperture in conjunction with beam scanning methods to interrogate large physical areas for RFID tags 200. Beam scanning methods known in the art can be utilized to scan physical areas. In one embodiment, the interrogator 100 incorporates mechanical movement of the antenna(s) to radially scan and/or translate the beam to scan an area. In another embodiment, the interrogator 100 incorporates phased array beam forming and control to scan an area. In one embodiment, the transmit array antenna 102A continuously transmits the electromagnetic radiation signals simultaneously while the receive array antenna 102B continuously receives the re-radiated electromagnetic radiation.

In another embodiment, the transmit array antenna 102A transmits the electromagnetic radiation in pulses while the receive array antenna 102B receives reflected electromagnetic radiation between pulses from the transmit array 102A. The interrogator can utilize an accurate electronic timing clock signal to measure the amount of time it takes for the signal to be transmitted and received back from the RFID tag(s) 200. The distance to the tag(s) 100 is able to be calculated knowing the propagation speed of the transmitted pulse multiplied by the measured time difference of the transmitted pulse and the received pulse. The calculated distance (z axis) used in conjunction with the spatially scanned data (x, y) can be used to provide three dimensional positioning information for the tags 200. It should be noted that the above is just an example embodiment, and the present invention can utilize any other appropriate methods to accurately transmit and receive the RF signals.

In one embodiment, the operational distance range between the interrogator 100 and various RFID tags 200 can be up to several hundred feet, depending on the environment and nature of any obstacles. In applications in which the electromagnetic radiation is transmitted and received at millimeter wave frequencies, various materials in the scanned area may absorb the RF energy. For example, in applications using the present system, it may be desired to interrogate tags 200 through paper and cardboard packaging materials, whereby the range between the interrogator 100 and the paper/cardboard packaging materials will be decreased to accommodate the attenuation. Considering that the present system 10 can be used in any conceivable RFID application, the present system 10 can be configured to determine the size of the desired beam pattern, the power of the RF transmission, and the types of focusing methods used, depending on the application.

The power used by the interrogator 100 depends on the distance range between the interrogator 100 and the RFID tag(s) 200 as well as frequency range(s) in which the system 10 operates as well as other factors. In one embodiment, the interrogator 100 is powered with 10 mW of transmit power and has an antenna gain of 30 dBi for each antenna array 102A and 102B, whereby the interrogator 100, after digital signal processing, develops a signal level margin per RFID tag antenna element of 10 dB. Larger RFID tags 200 will reflect signals over longer distance ranges. This, however, is only one example, and the present interrogator and/or RFID tag(s) are not limited to these values. The power utilized by the present interrogator depends on the specific application and whether the interrogator is a licensed or unlicensed device with reference to spectrum regulations or whether the interrogator is utilized in military applications. The transmit power level can be between a few microwatts to 100 mW. Other power values are contemplated and are in no way limited to the values provided herein.

The interrogator 100 preferably receives reflected electromagnetic radiation at the receiving array antenna 102B independently of the transmit array antenna 102A. The electromagnetic radiation indicated by pattern 128 received by the interrogator 100 is reflected from at least one RFID tag 200. As shown in FIG. 2, upon the antenna array 102B receiving the reflected electromagnetic radiation, the signal is converted into a radio frequency signal by the antenna array 102B. The received radio frequency signal is passed to the receive polarization and phase control block 120. The polarization and phase control block 120 interfaces with the receive antenna array 102B to create the desired polarization and phase response of the received signal and outputs the signal to the radio frequency receiver 118, as shown in FIG. 2. The radio frequency receiver 118 converts the received signal to baseband signals, whereby the baseband signals are provided to the DSP processor 114. The DSP processor 114 then preferably processes the received baseband signals using radar image signal processing algorithms to analyze the baseband signals. Such algorithms are derived from, but not limited to, algorithmic calculations utilized in synthetic aperture radar (SAR), inverse synthetic aperture radar (ISAR), interferometry SAR (InSAR), poliametric SAR (POLSAR), poliametric interferometry SAR (POLINSAR) and algorithms used in joint time frequency analysis (JTFA) applications. It should be noted that other radar signal imaging data processing methods are contemplated for use in the present system. Dependent on the applications in which the present system 10 is used, applying one or more of these types of image processing methods forms unique images of the scanned area. In one embodiment, an individual antenna on an RFID tag may be represented as a single pixel, whereby an optical view of the RFID tag(s) 200, along with its representative information, is provided on a display screen to identify and track the particular tag(s) 200. To better understand how the data is analyzed, a discussion of the antenna elements of the RFID tag 200 will first be discussed.

FIGS. 3-4 illustrate different embodiments of the RFID tag 200 of the present invention. FIGS. 3A and 3B illustrate one embodiment of the RFID tag 200 in accordance with the present invention. As shown in FIG. 3A, the tag 200 includes a substrate layer 202 having one or more conductive antenna elements 204, 206, 208, 210, 212, 214, 216, 218 thereon. For sake of brevity, the antenna elements shown in relation to FIG. 3A are generally referred to as having reference numeral 204, whereas the antenna elements will be described with their individual reference numerals of 206, 208, 210, 212, 214, 216, 218 where needed. It should be noted that the relative sizes, number and positions of the antenna elements 204 are illustrated in FIG. 3A as a non-limiting example, and are not limited thereto. It should also be noted that the antenna elements 204 are greatly exaggerated and not illustrated to scale, either individually, relative to each other, or relative to the substrate layer 202. Although the present description discusses several different tag configurations, any of the tag configurations are applicable even if only one tag reference numeral is discussed.

In one embodiment, the substrate layer 202 is disposed on or is integral with an optional conductive ground plane 203. The ground plane 203 can increase the radiation efficiency as well as allow greater control of the antenna element resonance, amplitude response, phase response and polarization response reflection parameters. However, operation without the use of a ground plane 203 will provide adequate response in many applications, including but not limited to, directly printing the antenna elements on the packaging containers 99 (FIG. 1E) or directly embedding the antenna structures into a manufactured product.

The antenna elements 204 are shown in FIG. 3A as having various length and width dimensions, whereby the width dimensions are preferably measured at the ends of the antenna dipoles. The length dimensions are preferably on the order of ½ wavelength, $\lambda/2$. The width dimensions of the antenna elements are preferably on the order of $\lambda/10$. As an example, at a frequency of 60 GHz, the dimension of a $\lambda/2$ antenna element is approximately 2.50 mm in free space. It is preferred that the antenna elements 204, 206, 208, 210, 212, 214, 216, 218 are positioned at least λ/2 apart from one another. It is contemplated, however, that the antenna elements can be separated less than λ/2 apart from one another.

The substrate layer material 202 provides an effect of decreasing the physical size of the wavelength which is associated with surface conductive elements according to equation (1).

$$\lambda_g = \lambda / \sqrt{\epsilon_r} \quad (1)$$

As shown in equation 1, $\lambda_g$ is physical wavelength (guide length), $\lambda$ is the free space wavelength and $\epsilon_r$ is the relative permittivity or dielectric constant of the substrate layer 202 material. For example, if the material of the substrate layer 202 has a dielectric constant of 2.0, the physical wavelength ($\lambda_g$) of a conductive element on the surface at a frequency of 60 GHz would be 3.54 mm, and the $\lambda_g/2$ element 206 would be 1.77 mm along the length dimension of the antenna element, according to equation (1). The thickness dimension of the substrate layer 202 is preferably on the order of λ/10 to λ/50, although other dimensions are contemplated.

The antenna elements 204, 206, 208, 210, 212, 214, 216, 218 of the tag 200 respond to incident electromagnetic radiation transmitted from the interrogator 100. In particular, the antenna elements 204 will resonate and convert the incident electromagnetic radiation into electrical signals if the frequency of the incident electromagnetic radiation corresponds with the wavelength characteristic of that antenna element 204. Upon being energized, the electrical signal produced by the antenna element 204 will flow through the conductive structure of the antenna element 204 as well as any terminating transmission line or electrical impedance which is coupled thereto.

Assuming the antenna element 204 is terminated directly into a low electrical impedance, as compared to the termination impedance of the antenna element itself, the antenna element 204 will immediately convert the electrical signal into electromagnetic radiation which is then re-radiated, also referred to as reflected, from the antenna element 204 to be received by the interrogator 100. However, the reflected radiation has parameters and characteristics such as amplitude, phase and polarization which are used by the interrogator 100 to identify each particular antenna element 204, the aggregate of which allows the interrogator 100 to identify the RFID tag 200 as well as any information related to the tag 200. These parameters are controlled by the physical characteristics of the antenna element 204 that produces the reflection.

As shown in the embodiment in FIG. 3A, the antenna elements 204, 206, 208, 210, 212, 214, 216, 218 have various dimensional lengths and rotational orientations. The dimensional lengths and orientations of the antenna elements 204, 206, 208, 210, 212, 214, 216, 218 control their particular phase and polarization responses, respectively, as well as allow the antenna elements 204, 206, 208, 210, 212, 214, 216, 218 to provide the information needed by the interrogator 100 to identify the antenna elements. Antenna element 204 in the upper left corner of the tag 200 in FIG. 3A preferably serves as a reference antenna element, whereby the orientations and thus polarization characteristics of the antenna elements 206, 208, 210, 212, 214, 216, 218 are determined relative to the reference antenna element 204. This allows the overall rotational orientation of the tag 200 (and thus the object to which the tag 200 is affixed) to be irrelevant in reading the antenna elements. In other words, the interrogator 100 will be able to effectively identify a tag 200 by virtue of its antenna elements 204, 206, 208, 210, 212, 214, 216, 218 irrespective of whether the tag 200 is right-side-up or upside down. It should be noted that the reference antenna element 204 can be located anywhere on the tag 200, or object to which the tag 200 is affixed to, and is not limited to the upper left corner. It should be noted that there can be more than one reference antenna element per tag 200 without departing from the scope of the present invention.

As shown in FIG. 3A, the antenna element 204 is shown having an orientation of 0° and being vertically polarized (V). The adjacent antenna element 206 in FIG. 3A is shown having an orientation of 90° and being horizontally polarized (H). The antenna elements 208 and 210 are shown at 45° and 135° (θ) and are polarized at their respective angles. Similarly, antenna elements 212 and 214 are shown to be vertically polarized (V), whereas antenna element 216 is shown to be horizontally polarized (H). Antenna element 218 is shown to be polarized at 45°. It should be noted that the particular rotational orientations shown and described are for example purposes and should not be limited to only those angles described. It is apparent that any angle, and thus polarization characteristic, is contemplated within the scope of the present invention.

For example purposes only, the antenna structures 204, 206, 208 and 210 have the same length dimension and thus re-radiate the RF signal to be in at the same phase. The antenna elements 212, 214, 216 and 218 in FIG. 3A are shown to have different length dimensions. Although antenna elements 212 and 214 are vertically polarized (0°) like the antenna element 204, elements 212 and 214 have different length dimensions from each other as well as element 206 such that elements 212 and 214 have different phase response characteristics. Antenna elements 212 and 214 thus respond and reflect different phases of electromagnetic radiation from one another as well as antenna element 204. Antenna element 216 is horizontally polarized at 90°, like antenna element 206, however, antenna element 216 will respond and reflect a different phase than element 206 due to the difference in the length dimension. The same theory applies to antenna element 218.

Figure 3C:
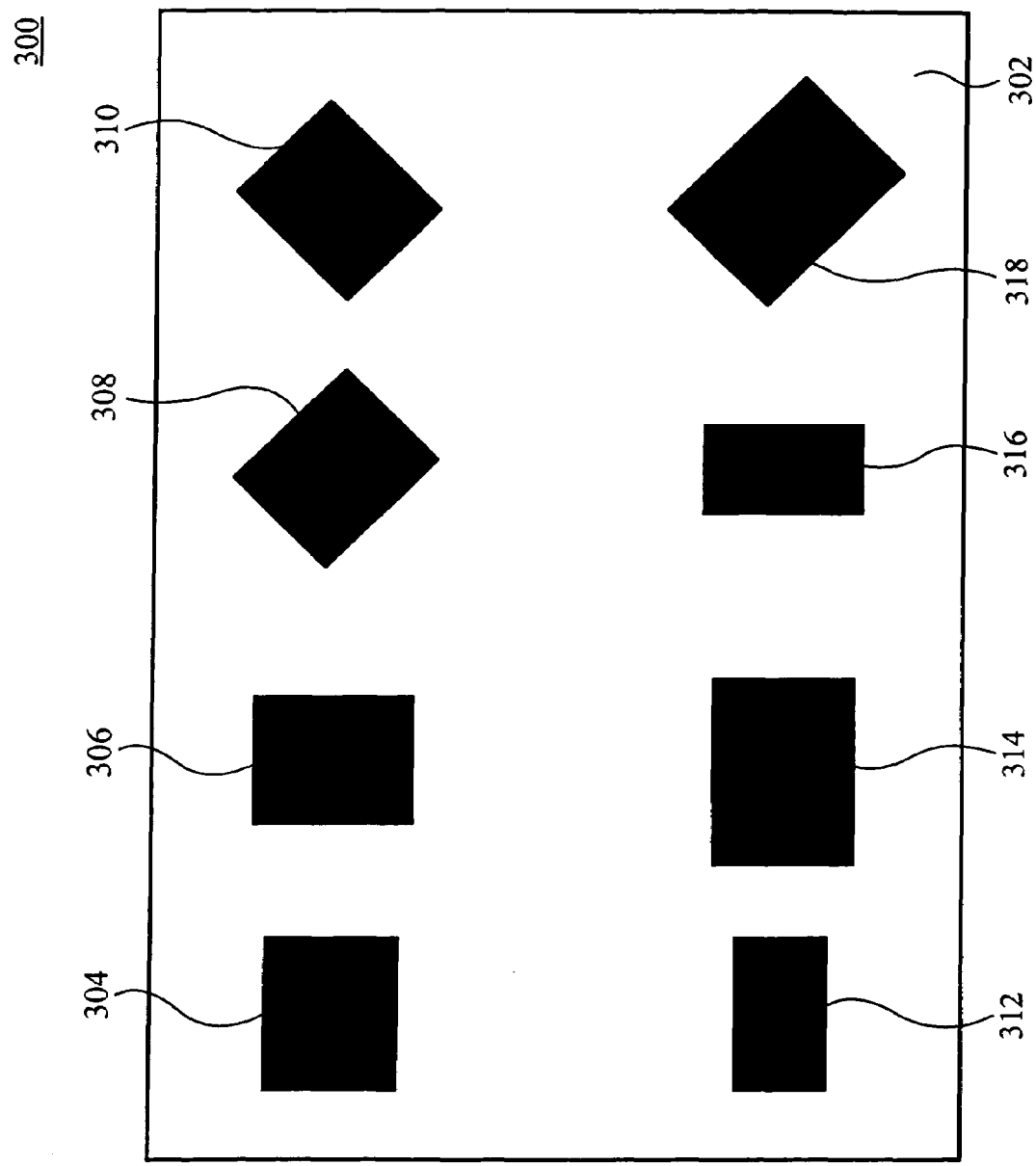
FIG. 3C schematic of another RFID tag antenna configuration on a substrate in accordance with one embodiment of the present invention.

FIG. 3C illustrates another embodiment of the RFID tag 300 according to the present invention. As shown in FIG. 3C, the antenna elements 304, 306, 308, 310, 312, 314, 316, 318 are shown to be a strip of rectangular or square conductive material. The antenna elements are configured to be on the order of $\lambda_g/2$ along both, the length and width dimensions, whereby the width dimension is such that the rectangular antenna elements respond to the resonant frequency. The antenna elements are also preferably positioned at least one λ/2 apart from one another. As with the RFID tag 200 in FIG. 3A, the physical dimensions and orientations of the antenna elements vary in order to control individual antenna element phase and polarization reflective parameters.

Figure 4A:
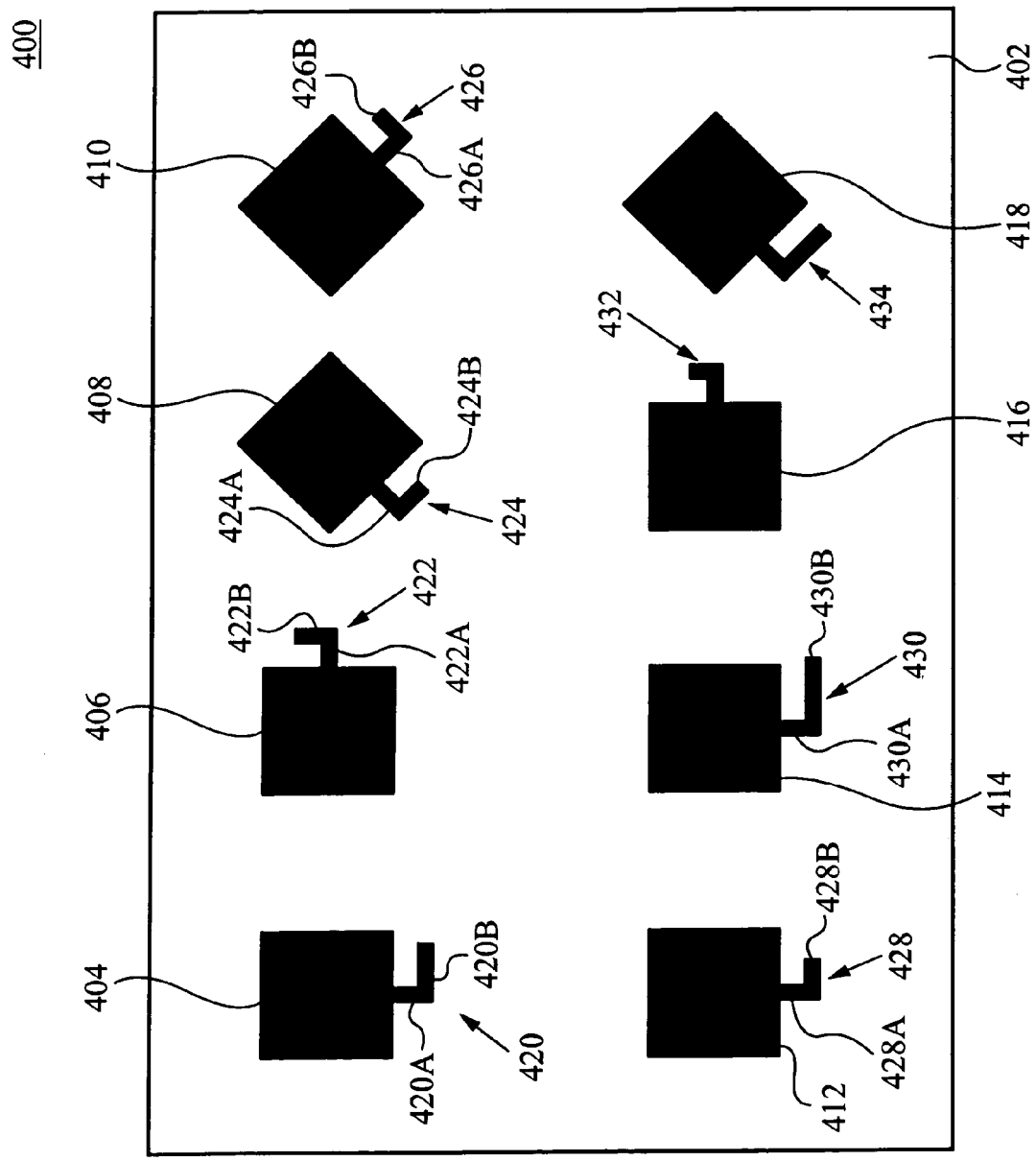
FIG. 4A illustrates a schematic of another RFID tag antenna configuration on a substrate in accordance with one embodiment of the present invention.

FIG. 4A illustrates another embodiment of an RFID tag 400 according to the present invention. As shown in FIG. 4A, the antenna elements 404, 406, 408, 410, 412, 414, 416, 418 have the same length and width dimensions. In another embodiment, one or more of the antenna elements 404, 406, 408, 410, 412, 414, 416, 418 have length and width dimensions different from one another. Although eight antenna elements 404, 406, 408, 410, 412, 414, 416, 418 are shown on the substrate 402 in FIG. 4A, it should be noted that any number of antenna elements, including only one, is contemplated. For sake of brevity, the antenna elements shown in relation to FIG. 4A are generally referred to as having reference numeral 404, whereas the antenna elements will be described with their individual reference numerals of 404, 406, 408, 410, 412, 414, 416, 418 when needed.

Each antenna element shown in FIG. 4A includes a transmission line element extending therefrom. In particular, antenna element 404 includes transmission line element 420 whereas antenna element 406 includes transmission line element 422, and so on. As shown in FIG. 4A, the transmission line elements 420, 422, 424, 426, 428, 430, 432 and 434 vary in length and position with respect to one another, whereby the length and position of the transmission line elements control the phase and polarization parameters at which the antenna elements respond to the incident electromagnetic radiation. The transmission line element for each antenna element 404 in FIG. 4A includes a first transmission line 420A and a second transmission line 420B, whereby the first transmission line 420A extends out perpendicularly from the antenna element 404. The second transmission line 420B extends from the first transmission line 420A at a right angle and is parallel to the side of the antenna element 404.

The position and overall length of the transmission line element 420 controls the antenna element's polarization and phase response when receiving the incident electromagnetic radiation. In FIG. 4A, the orientation of the transmission line element 420 is 0° and is referenced as being vertically polarized (V). The orientation of the transmission line element 422 is 90° and is referenced as being horizontally polarized (H). For antenna elements 408 and 410, the orientation of the transmission line elements 424 and 426 are 135° and 45°, respectively.

As stated, the overall length of the transmission line element 420 also controls the response of the phase parameter when receiving the incident electromagnetic radiation. As shown in FIG. 4A, the transmission line element 420 has a greater length dimension than the transmission line element 428, but has a smaller length dimension than the transmission line element 430. The difference in the overall length dimension causes the antenna elements 404, 412 and 414 to reflect the incident electromagnetic radiation at a different phase. The other antenna elements 406, 408, 410, 416 and 418 have various length dimensions and orientations of the transmission line elements that affect the phase and polarization reflective parameters respectively.

Figure 4B:
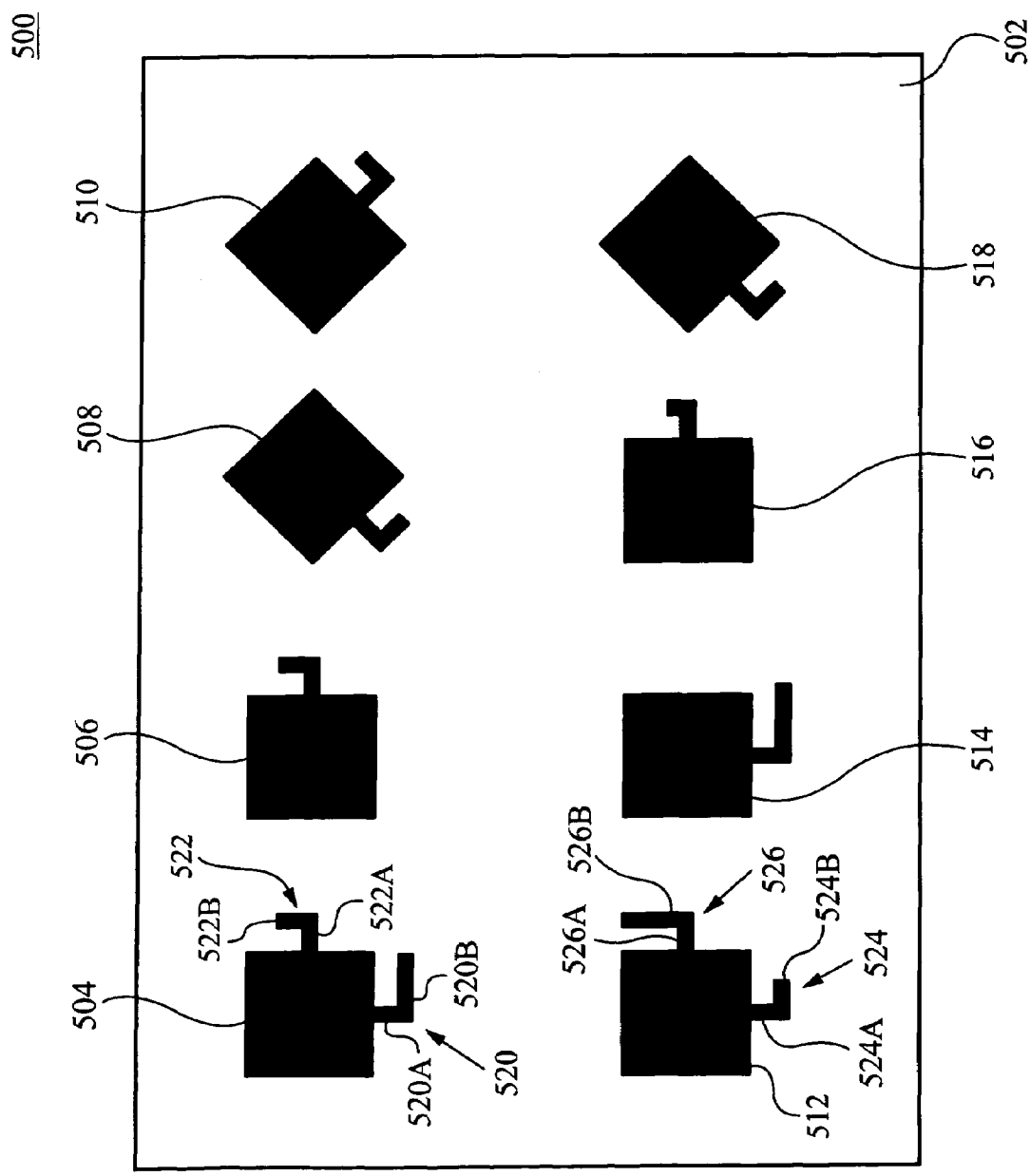
FIG. 4B illustrates a schematic of another RFID tag antenna configuration on a substrate in accordance with one embodiment of the present invention.

FIG. 4B illustrates another embodiment of the RFID tag 500 which preferably includes antenna elements 506, 508, 510, 512, 514, 516, 518 and 520. As shown in FIG. 4B, the antenna elements each include one or more transmission line elements whereby the transmission line elements vary in length, position and number with respect to one another. Antenna elements 508, 510, 512, 516, 518 and 520 are similar to the antenna elements discussed in FIG. 4A and will not be discussed again. However, antenna elements 504 and 512 each include two sets of transmission line elements 520 and 522, respectively.

The antenna elements 504 and 512 shown in FIG. 4B are circularly polarized, whereas the remaining shown antenna elements are linearly polarized. For example, in antenna element 504, the transmission line element 520 is oriented and shown to be greater in the length dimension than the transmission line element 522. The orientation and greater length dimension preferably causes the transmission line element 520 to have a phase delay that is $\pi/2$ radians greater than the phase delay of the other transmission line element 522. This difference in phase delay generates a quadrature phase condition on the adjacent sides of the antenna element 504 which creates a circular polarization parameter (e.g. LC, RC). In particular, the direction of the circular polarization (either right-hand or left-hand) is determined by which side of the square patch antenna is either leading or lagging in quadrature ($\pi/2$ radians). For example, the transmission line element 524 of the antenna element 512 is shown in FIG. 4B to have a greater length dimension that the transmission line element 526. This difference in the length dimension between the transmission line elements 524 and 526 creates a quadrature phase condition on the adjacent sides of the antenna element 512 that is opposite in the circular polarization direction as compared to that of the antenna element 504. These double tuned antenna elements 504, 512 allow the elements 504, 512 to provide additional information in the form of circular polarization of the electromagnetic radiation, as discussed below.

For one or more of the above discussed antenna structures, the structures are preferably made of conductive ink which can be printed on the substrate or other surface. The antenna structures, and thus the RFID tags, can be produced very inexpensively from a laser, ink jet or commercial printer. The antenna structures can also be printed using other conventional methods of making RFID tags. In another embodiment, the antenna structures can be etched, deposited or applied using any other appropriate method.

Figure 5:
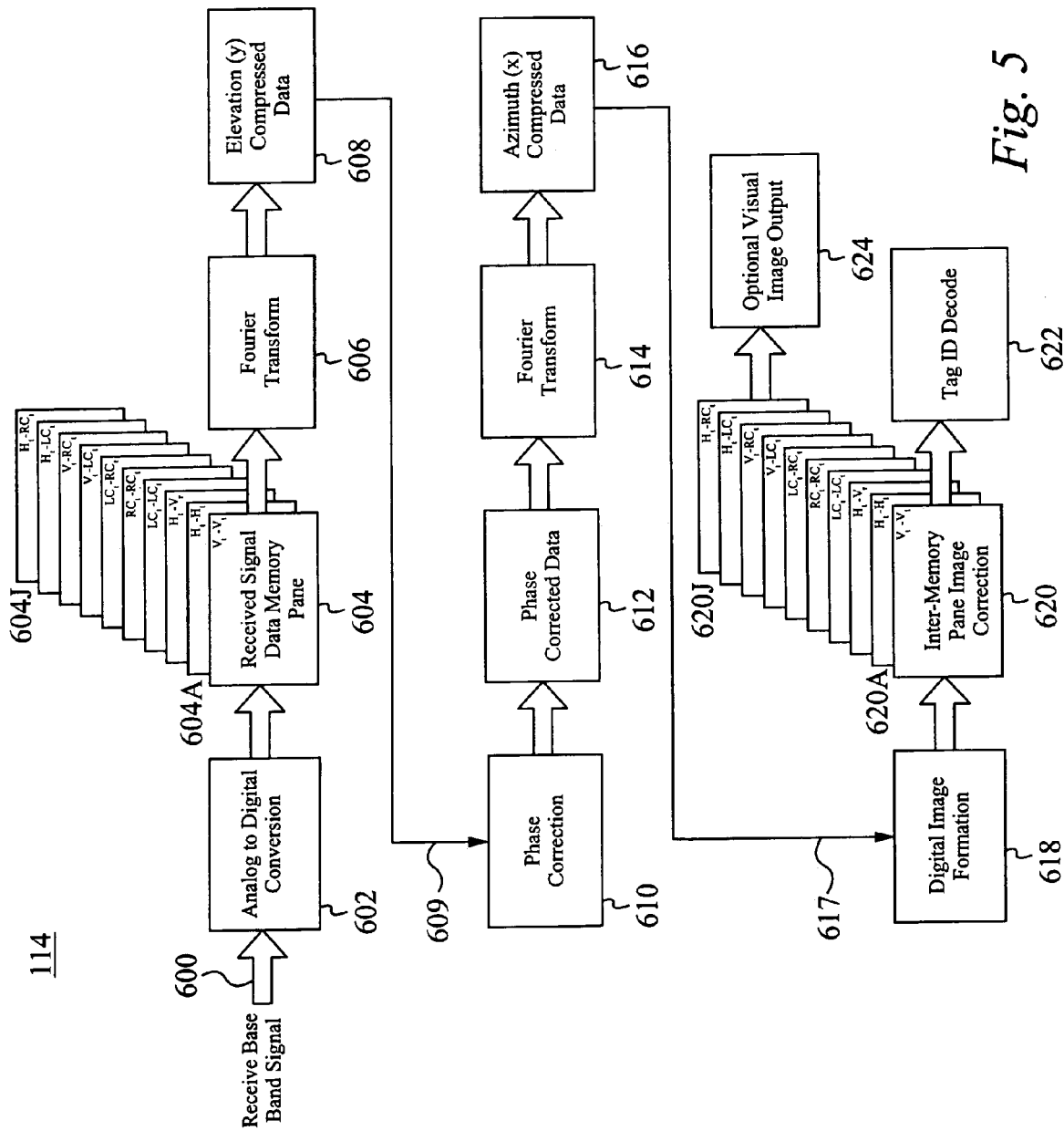
FIG. 5 illustrates a block diagram of the decoding process in accordance with one embodiment of the present invention.

FIG. 5 illustrates a flow diagram of one example method in which the DSP processor 114 of the interrogator 100 processes and analyzes the received signal to decode and identify and retrieve information from the RFID tag 200. As discussed above in relation to FIG. 2, the transmit polarization and phase control block 110, in conjunction with transmitting array antenna 102A and DSP processor 114, create and transmit incident electromagnetic radiation that has polarization parameters sequenced in time. The polarization of the electromagnetic radiation can be vertical V, horizontal H, right-handed circular RC or left-handed circular LC. Once the incident electromagnetic radiation resonates the antenna structures of the RFID tag(s) (FIGS. 3-4), the tag 200 reflects the radiation which is then received at the receiving array antenna 102B of the interrogator 100. The receive polarization and phase control block 120 (FIG. 2), in conjunction and the DSP processor 114, creates predetermined antenna configurations which are more sensitive to certain reflected electromagnetic radiations. The predetermined polarization configurations are sequenced and stored such that interrogator 100 is able to compare the polarization diversity of the received reflected signals to that of the stored configurations to aid in identifying and decoding the tag 200.

Ordinary backscatter reflection from objects other than RFID tags will be received by the interrogator 100 and will have random polarization and phase compared to the antenna elements of on the tag(s). Thus, antennas with known phase and polarization parameters are printed into the coded pattern at known relative locations to establish an a priori reference return signal. This technique provides an effective method to lock onto the tag 200 and create a phase and polarization decoding reference for the interrogator.

By controlling how the polarized radiation is transmitted and received, the polarization configuration associated with the transmitted and received radiation controls how the sampled received signal information is stored in a time-indexed manner. In one embodiment, such received signal information is sequenced in time and indexed in memory. As shown in FIG. 5, the baseband signal is received from the radio frequency receiver block 118 (FIG. 2). In one embodiment, the baseband signal is received in analog form, whereby the analog signal is converted into digital form (step 602). The converted digital signal is preferably made up of time sequences of transmit-receive polarization combinations of $V_t$-$V_r$, $H_t$-$H_r$, $H_t$-$V_r$, $LC_t$-$LC_r$, $RC_t$-$RC_r$, $LC_t$-$RC_r$, $V_t$-$LC_r$, $V_t$-$RC_r$, $H_t$-$LC_r$ and $H_t$-$RC_r$ at given times. For example, the polarization combination $V_t$-$LC_r$ represents data received when vertically polarized radiation was transmitted and left-circular polarized radiation was received for a particular time. Each polarization combination set of time-indexed polarization samples is preferably stored in one of separate memory locations known as polarization memory image panes, shown as 604A-604J. It should be noted that the present invention is not limited to the polarization combinations shown and described herein and any number of individual or combination of polarization radiation that is transmitted and received is contemplated.

Radar image signal processing is applied to each memory pane in step 606, preferably by performing Fourier Transform algorithms on the received data. Fourier transformed data is symbolized by two data locations in memory for each sample, whereby magnitude and phase information of each sample is able to be computed from the data. By computing the magnitude and phase information for each sample, the polarization and phase information of each antenna element in any number of RFID tags 200 in the scanned area can be determined.

As shown in FIG. 5, once the data is processed using Fourier Transform algorithms, synthetic aperture radar calculations are performed on the data to calculate compressed elevation data (y) samples 608. If needed, phase correction calculations are then performed on the elevation data 608, as shown in 610. The corrected phase data 612 is then preferably processed again using Fourier Transform algorithms to calculate compressed azimuth data (x) samples 616. From the elevation 608 and azimuth 616 data samples, a preliminary digital image 618 of the scanned area can be formed, whereby the multiple memory panes of data 620A-620J are then used to decode the tags 200 and/or output a visual image 624 of both the tags 200 and the entire scanned area containing the tags 200.

By creating multiple memory panes of data 620A-620J, the present system is able to correlate and recognize tag pattern data. For example, if the transmitted array antenna 102A is vertically polarized V and the received array antenna 102B is also vertically polarized V at a given time, the data samples taken at that period are stored in a unique memory location, indexed by time, designated as $V_t$-$V_r$. If the transmitter is H and the receiver is V, a separate memory pane location is used and is distinguished as $H_t$-$V_r$, etc. Through valid mathematical permutations, the set of memory panes necessary to analyze the different combinations of transmit and receive polarizations comes out to be the set of $V_t$-$V_r$, $H_t$-$H_r$, $H_t$-$V_r$, $LC_t$-$LC_r$, $RC_t$-$RC_r$, $LC_t$-$RC_r$, $V_t$-$LC_r$, $V_t$-$RC_r$, $H_t$-$LC_r$, and $H_t$-$RC_r$. By mathematically correlating between these image panes, recognition of the tag's polarization and phase can be deduced. Inter memory pane mathematical correlation is then applied to derive image detail that emphasizes polarization content within the image. Unique images are then able to be formed for each set of time-indexed polarization combinations.

Accurate SAR imaging of the objects, walls or buildings around the tag(s) 200 can also be useful in processing the location of the tag(s) 200 within the context of the objects represented in scanned area. In one embodiment, the interrogators can be used in conjunction with a GPS system and graphical mapping software to locate and track the position of the RFID tag relative to geographic coordinates. It is contemplated that the RFID tag 200 as well as one or more interrogator's location can be indicated on a mapped graphical display for user recognition of the target's location. In one embodiment, this is performed by the system 10 mapping the interrogator's position by scanning the boundary area, such as the walls of a room. Once the boundary perimeter is established, the location of the interrogator within the perimeter can be determined and the bearings of the tags 200 can be determined as well. It should be noted that the locations of the interrogator 100 as well as the tags 200 can be determined in a stationary setting, such as a room, or while the interrogator and/or the tags 200 are moving.

As shown in FIG. 5, mathematical focus calculations preferably utilizing radar image signal processing are performed on the recognized individual tag structures 200 to deduce the frequency and phase response of one or more given tag antenna structures 200. In deducing the polarization, frequency and phase response, the information on the tag 200 can be decoded 622. For example purposes only, FIG. 6 illustrates a table showing an example RFID tag antenna structure code decoding scheme. It should be noted that the table shown in FIG. 6 only takes into account the polarization and phase characteristics of the antenna structures to decode the structures. For example purposes, the table in FIG. 6 will be explained in relation to the RFID tag discussed in FIG. 3A. However, it should be noted that the table can be used with any other antenna configuration and is not limited to that shown in FIG. 3A.

As shown in FIG. 6, the table provides a four-level polarization code and a four-level phase code. The table is thus set up such that, together, there can be 16 different combinations or states represented from the polarization and phase information received from the RFID tag 200. In binary data terms, the bit size of the code is defined by $\log_2 16=4$. Therefore, the table in FIG. 6 provides all possible combinations of a 4-bit code in terms of polarization and phase.

As stated above, in one embodiment, the interrogator 100 transmits RF signals as a modulated frequency carrier (e.g. FMCW) that is swept over a large frequency range many times per second. Considering that the tag antenna structures can be tuned to re-radiate different wavelengths of signals by changing the geometry of the structures, the represented polarization and phase combinations in the sample table in FIG. 6 can be repeated at different, separated frequencies. This, in turn, allows for more bits to be encoded, and thus decoded, for a given antenna structure. The degree of frequency separation will depend on the antenna structure, electrical conductivity, and the substrate dielectric losses which both affect the resonance sharpness (i.e. Q factor). For example, if four frequency "bins" were used to analyze separate 4-bit polarization and phase data in each bin, a total of 4×16 or 64 total combinations would be feasible. Since $\log_2 64=6$, a 6-bit code would thus result for each antenna structure utilizing a 4-bin frequency separation.

In one embodiment, the present system can accommodate for higher density codes in applications which desire higher quantities of coding of bits per antenna structure, thereby resulting in more encoded data per tag area. As a non limiting example of the number of data bits that can be coded into a given tag area, one square inch of tag can accommodate approximately 25 individual $\lambda/2$ microstrip patch antennas spaced at one wavelength apart ($\lambda$), or 5 mm at a frequency of 60 GHz. Using a 6-bit coding schema, the total number of bits encoded into a square inch of area would be 6×25=150 bits. Using the same coding schema at 92 GHz ($\lambda$=3.2 mm), approximately 60 individual patch antennas fit within one square inch. Thus, 360 bits (6×60) can be encoded.

Figure 7:
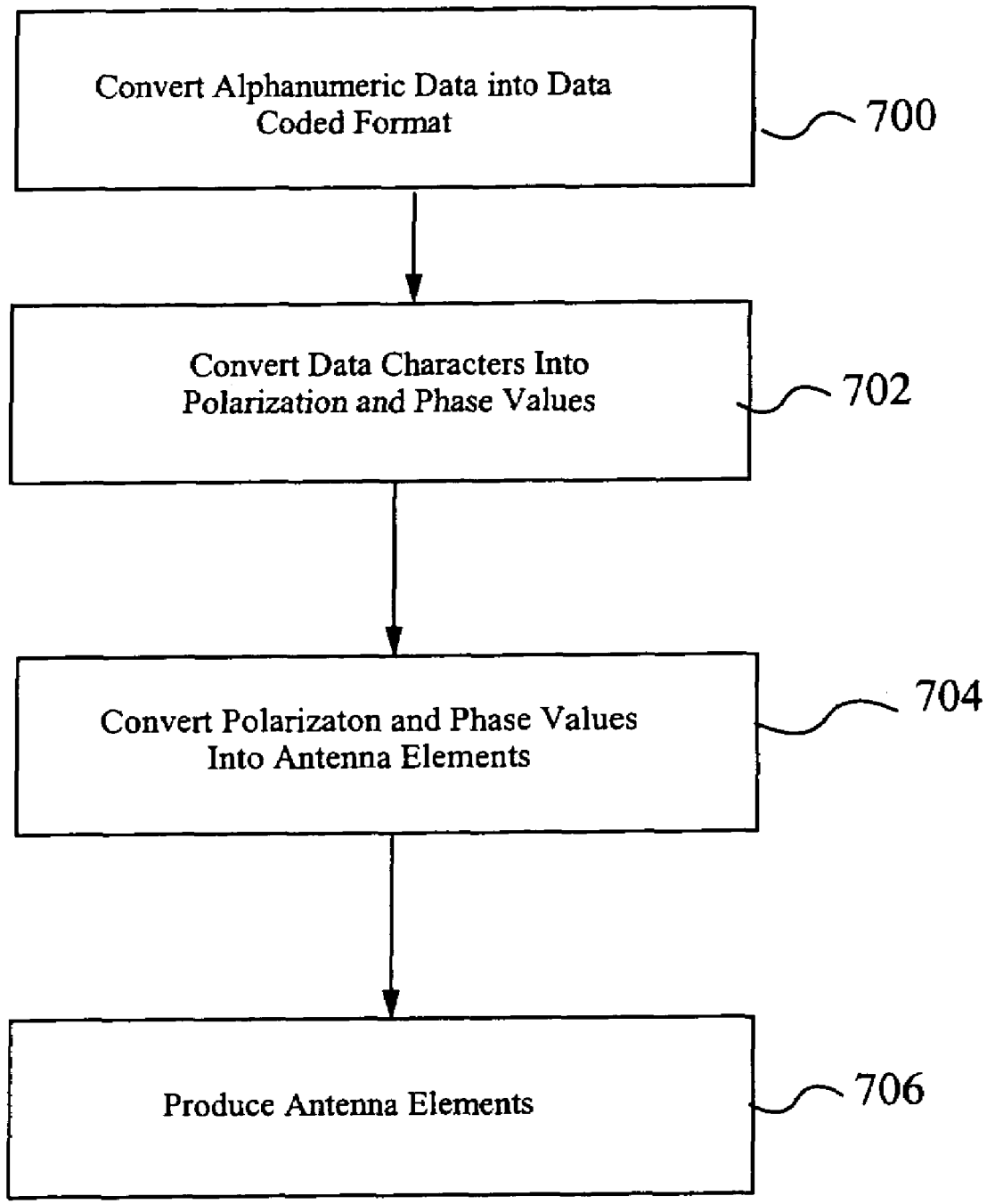
FIG. 7 illustrates a flow diagram of one example encoding process in accordance with one embodiment of the present invention.

FIG. 7 illustrates one example method in how the antenna elements can be encoded. As shown in FIG. 7, whatever information that is to be coded is initially converted from alphanumeric characters into a data coded format (e.g. ASCII) (step 700). The data characters are then preferably converted into appropriate phase and polarization values which can be standard or proprietary (step 702). Following, the phase and polarization values for each character is then preferably converted into the appropriate antenna structure (step 704). This entire process can be performed by a software program which then sends the information to a printer (706) to produce the antenna structure configuration. It is contemplated that reference antenna elements will be placed in the printed antenna configuration, as discussed above. In one embodiment, error correction coding methods (e.g. parity coding, turbo coding) are applied to the data which is to be eventually coded into the antenna elements. In one embodiment, the antenna elements are encoded and decoded utilizing encryption/decryption methods for security. Such methods include, but are not limited to, use of hash algorithms, digital signatures such as MD2, MD4, MD5 and/or SHA algorithms. Hash algorithms can also be used in the context of the present invention to improve signal randomness for detection enhancement.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. An RF data tag identification system comprising:
   a chipless, passive RF data tag having encoded information, the RF data tag including an antenna element having predetermined phase and polarization parameters; and
   at least one interrogating device configured to transmit electromagnetic radiation and receive re-radiated electromagnetic radiation from the RF data tag, wherein the at least one interrogating device is configured to decode the encoded information from at least one polarization parameter and at least one phase parameter in the received re-radiated electromagnetic radiation.

2. The system of claim 1 wherein the RF data tag further comprises a reference antenna element, wherein the reference antenna element is separated from the antenna element by at least one-half wavelength.

3. The system of claim 1 wherein at least one of the interrogating device and RF data tag is capable of moving.

4. The system of claim 1 wherein the interrogating device is configured to determine the polarization and phase parameters from the re-radiated electromagnetic radiation using a radar image signal processing algorithm.

5. The system of claim 1 further comprising a display coupled to the interrogating device which produces an image of an area scanned from the electromagnetic radiation transmitted and received, wherein the image includes at least one of a location and identity of the RF data tag.

6. The system of claim 1 further comprising a plurality of interrogating devices coupled to one another, wherein at least one interrogating device in the plurality is configured to provide RF data tag information to at least one other interrogating device in the plurality.

7. The system of claim 6 wherein a first interrogating device is configured to transmit electromagnetic radiation and the plurality of interrogating devices is configured to receive the re-radiated electromagnetic radiation substantially simultaneously.

8. The system of claim 6 wherein a first interrogating device is configured to transmit electromagnetic radiation and the plurality of interrogating devices is configured to receive the re-radiated electromagnetic radiation in a desired sequence.

9. The system of claim 6 wherein a plurality of interrogating devices is configured to transmit electromagnetic radiation sequentially and the plurality of interrogating devices is configured to receive the re-radiated electromagnetic radiation substantially simultaneously.

10. The system of claim 6 wherein a plurality of interrogating devices is configured to transmit electromagnetic radiation in a first sequence and the plurality of interrogating devices is configured to receive the re-radiated electromagnetic radiation in a second sequence.

11. The system of claim 1 wherein the RF data tag is in the far field with respect to the interrogating device.

12. The system of claim 1 wherein the RF data tag at least 3 meters away from the interrogating device.

* * * * *